RITER & SWANN.
Churn.
No. 64,367.
Patented April 30, 1867.
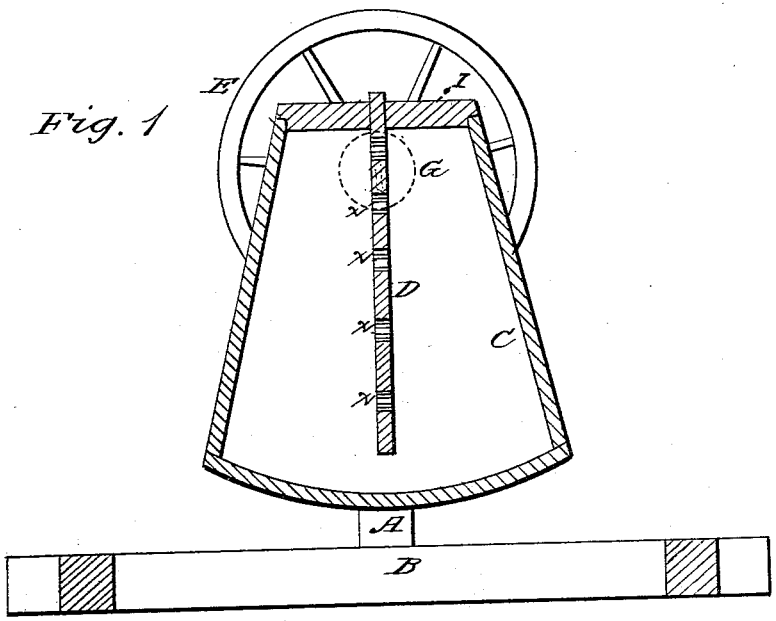
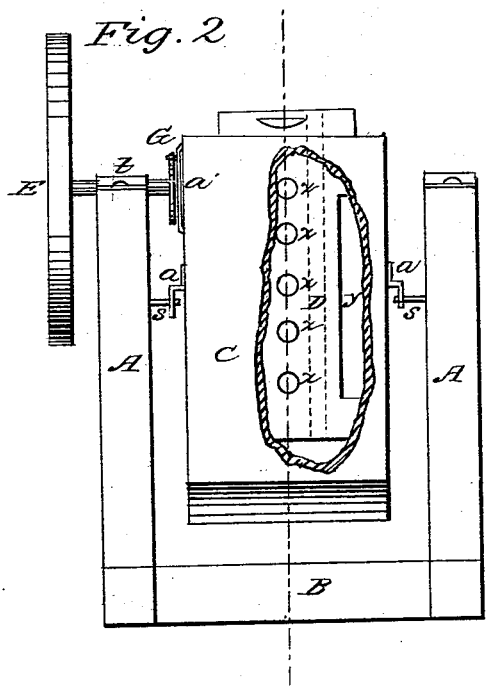
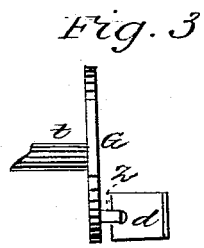
Witnesses:
Inventors
Riter & Swann
per
Alexander F Mason
Atty

United States Patent Office.

JOHN L. RITER AND R. C. SWANN, OF BROWNSVILLE, INDIANA, ASSIGNORS TO THEMSELVES AND T. J. WEST AND R. B. PERRY, OF UNION COUNTY, INDIANA.

Letters Patent No. 64,367, dated April 30, 1867.

IMPROVEMENT IN CHURNS.

The Schedule referred to in these Letters Patent and making part of the same.

TO ALL WHOM IT MAY CONCERN:

Be it known that we, JOHN L. RITER and R. C. SWANN, of Brownsville, in the county of Union, and in the State of Indiana, have invented certain new and useful improvements in Churns, and do hereby declare that the following is a full, clear, and exact description thereof, reference being had to the accompanying drawings and to the letters of reference marked thereon, making a part of this specification.

Our invention consists in the construction of a movable churn, with stationary dasher and its bearings.

In the annexed drawings, A A represent two uprights secured upon a suitable base, B. C represents the churn-box, which is of wood, and constructed with a curved bottom, and tapering from bottom to top, as shown in Figure 1. D represents the dasher, which is secured to the lid I, and has a series of perforations, $x\ x\ x$, in its centre, for the passage of air, and a slot, $y\ y$, at each side. This dasher does not extend to the bottom of the churn, leaving a space for the cream to pass back and forth as the churn is operated. Attached to the sides of the churn-box, near its centre, are metallic plates, suitably bent, and provided with slots, (see $a\ a$,) by which means the churn is pivoted to the bearings A A upon its pins $s\ s$. Near the top of the churn-box, upon one side, is a metallic plate, $d$, which is bent so that it bulges slightly outward from the box, and is provided with an oblong slot near its entire length. E represents a fly-wheel, having a suitable crank, which is attached to the outer end of a shaft, $t$, upon one of the bearings A. Upon the inner end of this wheel is a circular metal plate, G, which has a stationary pin, $z$, secured upon its face near the edge or circumference of the wheel, and which said pin passes into the slot in the plate $d$. The cream is placed within the box C, and said box then placed upon the bearings $s\ s$, which allows the pin $z$ of the plate G to catch into the slot in the plate $d$. The handle is then turned, which causes the box to vibrate and throw the cream from side to side of the box, by means of its curved bottom, and through the dasher D. This churn can readily be removed from its bearings for cleaning, and is found to be a most effectual device for the purposes for which it is intended.

We are aware that churns with stationary dashers are not new. What we claim, is—

The arrangement of the shaft and fly-wheel E, with plate G, having a pin, $z$, near its periphery, which works into a slotted plate, $d$, upon the side of the churn C, for operating said churn-box upon its bearings, as herein set forth.

In testimony that we claim the foregoing, we have hereunto set our hands and seals this ninth day of February, 1867.

JOHN L. RITER,
R. C. SWANN.

Witnesses:
T. J. WEST,
DANIEL JONES.